United States Patent [19]

Fehsenfeld et al.

[11] Patent Number: 5,019,273

[45] Date of Patent: May 28, 1991

[54] METHOD FOR RECOVERY OF HEAVY METALS FROM HIGHLY CONCENTRATED WASTEWATER SOLUTIONS

[75] Inventors: Joseph Fehsenfeld, Barrington; Boro Vujasin, Des Plaines, both of Ill.

[73] Assignee: Midwest Printed Circuits Services, Inc., Wheeling, Ill.

[21] Appl. No.: 517,335

[22] Filed: Apr. 30, 1990

[51] Int. Cl.$^5$ .............................. C02F 1/62; C02F 1/70
[52] U.S. Cl. ...................................... 210/719; 210/912; 210/726; 210/772; 75/726; 75/731; 204/149; 204/DIG. 13
[58] Field of Search ............... 210/737, 912, 702, 719, 210/726, 710, 757, 772; 75/726, 731, 710, 754, 109; 204/149, 150, DIG. 13; 423/111

[56] References Cited

U.S. PATENT DOCUMENTS

| | | | |
|---|---|---|---|
| 2,038,850 | 4/1936 | Murphy, Jr. ........................... | 75/726 |
| 3,194,653 | 7/1965 | Keyes .................................... | 75/731 |
| 3,575,853 | 4/1971 | Gaughan et al. ..................... | 210/667 |
| 3,816,306 | 6/1974 | Roy ....................................... | 210/49 |
| 3,905,827 | 9/1975 | Goffredo et al. ..................... | 75/726 |
| 3,922,224 | 11/1975 | Lewandowski ..................... | 210/912 |
| 4,294,434 | 10/1981 | Durkee ................................. | 75/731 |
| 4,304,599 | 12/1981 | Durkee ................................. | 75/731 |
| 4,450,002 | 5/1984 | Durkee ................................. | 75/726 |
| 4,512,900 | 4/1985 | Macur et al. ........................ | 210/748 |
| 4,652,381 | 3/1987 | Inglis .................................... | 210/724 |
| 4,671,882 | 6/1987 | Douglas et al. ...................... | 210/720 |
| 4,695,447 | 9/1987 | Shultz .................................. | 423/659 |
| 4,814,091 | 3/1989 | Napier et al. ........................ | 210/665 |
| 4,950,326 | 8/1990 | Holly .................................... | 210/912 |

FOREIGN PATENT DOCUMENTS

| | | | |
|---|---|---|---|
| 50-17778 | 6/1975 | Japan .................................... | 210/719 |
| 51-62184 | 5/1976 | Japan .................................... | 210/719 |

Primary Examiner—Stanley Silverman
Assistant Examiner—Neil M. McCarthy
Attorney, Agent, or Firm—Niro, Scavone, Haller & Niro

[57] ABSTRACT

Heavy metals are reclaimed from a concentrated wastewater solution containing heavy metal cations and an acid by adding to the wastewater a bed of scrap aluminum in a total amount between about 160% and about 180% of the stoichiometric requirement for complete reduction of the dissolved heavy metal cations to their elemental states and adjusting the acid content of the wastewater to 5% to 20% by volume and allowing the heavy metal cations to react with the scrap aluminum to oxidize the aluminum and to reduce the heavy metal cations to their elemental states thereby producing demetallized wastewater which is neutralized with caustic to produce a treated effluent.

12 Claims, 7 Drawing Sheets

METHOD FOR RECOVERY OF HEAVY METALS FROM HIGHLY CONCENTRATED WASTEWATER SOLUTIONS

BACKGROUND OF THE INVENTION

1. Field of the Invention

Heavy metals occur as cations in acidic (and, occasionally, alkaline) wastewaters produced during manufacture of printed circuit boards and in other industrial processes. Some wastewater streams containing copper cations are both highly concentrated (that is, in excess of several thousand ppm by weight of metal) and very acidic (pH below 1.0). Copper, lead and tin in particular may be recovered in saleable form from these wastewater streams by contacting them with scrap aluminum, another byproduct of the manufacture of PC boards, in an aqueous solution of sulfuric acid. Other metals of Groups IB, IIB, IIIA, and IVA of the Periodic Table also can be recovered using the process and apparatus of thin invention, to the extent cations of such metals may be present in wastewaters being treated. In the process of this invention, controlled, stepwise addition of aluminum during the reduction process, coupled with control of the acid concentration, improves reaction rates, reduces the danger of thermal runaway and limits oxidation of aluminum compared to conventional processes.

The invention relates to recovery of Group IB, IIB, IIIA and IVA metals from acidic or alkaline wastewaters produced in various manufacturing industries. More particularly, it relates to treatment of wastewater streams produced during PC board manufacturing operations to recover copper, lead and tin therefrom in saleable from, while reducing the concentration of toxic metal cations in the treated wastewater to levels safe for discharge to municipal sewer systems.

2. Description of the Prior Art

Plating of PC boards and subsequent steps in PC board manufacture produce some wastewater streams that contain very high concentrations of $Cu^{+2}$ cations. These streams come from pickling acids and electroless copper solutions, and may contain from 1,000 ppm to as high as 500,000 $Cu^{+2}$ by weight. They typically also contain high concentrations of $H_2SO_4$, typically enough to produce pH levels of 1.0 or less. In some situations, such $CU^{+2}$-containing streams may be alkaline Additionally, washing steps that follow the etching process produce wastewater streams containing lower concentrations of $Cu^{+2}$ cations, typically in the 20 ppm to 50 ppm range. Later washing steps produce wastewater streams containing Pb and Sn cations that result from subsequent soldering operations. Federal, state and local environmental regulations prohibit discharge of wastewaters containing Cu, Pb and Sn cations because of their toxicity; discharge levels of 1 ppm or below are considered desirable, and in some states such as California discharge levels as low as 0.4 ppm may be required. Discharge of highly acidic wastewaters to municipal sewers is also undesirable. Accordingly, various methods of reducing the cation content of these wastewaters and producing a near-neutral treated stream have been proposed.

A customary method of treating these wastewaters is by addition of large amounts of alkali salts, such as $NaOH \cdot Na_2CO_3$ or KOH, which causes precipitation of a floc of $Cu(OH)_2$. One such process is described in U.S. Pat. No. 3,816,306 (Roy). While this treatment also neutralizes the wastewater, it leaves Na+ or K+ cations in solution and produces large volumes of unsalable floc, essentially trading one disposal problem for another.

Another method of purification uses ion exchange to replace $Cu^{+2}$ cations with less-toxic cations in solution. But ion exchange techniques also produce unsalable spent ion exchange media that must be disposed of in landfills or otherwise.

A more promising approach is to contact the wastewater containing metal cations including those of Cu, Pb or Sn with a more electropositive, non-toxic metal in elemental form. In this manner, the toxic cations are reduced to elemental state, a form in which they have value as byproducts, and the wastewater is cleansed of toxic metal cations. Because elemental aluminum is another byproduct of PC board manufacture, and aluminum is both low in toxicity and more electropositive than Cu, Pb or Sn, it is commonly suggested for recovery processes of this sort.

One such process is described in detail in U.S. Pat. No. 4,304,599 (Durkee). In that continuous process, wastewater containing $Cu^{+2}$ cations is adjusted to a pH of 2 or less by addition of sulfuric acid, and then contacted in stagewise fashion with aluminum tailings retained between screens in a series of reaction cells through which the wastewater is pumped. Overall wastewater residence time is about three hours. A very large excess of aluminum is employed; in the example given by Durkee roughly 50 times the stoichiometric requirement for reaction with the $Cu^{+2}$ cations being processed. (Even the first cell of the Durkee apparatus alone contains almost three times the stoichiometric requirement of elemental aluminum.) Following reaction with the aluminum, the wastewater contains about 50 ppm of $Cu^{+2}$. It is then mixed with other waste streams that are substantially copper free, reducing the $Cu^{+2}$ concentration to about 1.25 ppm. Finally, it is neutralized with caustic and discharged. Details of the reaction cell layout used for this process are described in U.S. Pat. No. 4,294,434 (Durkee).

In another version of the Durkee process, described in U.S. Pat. No. 4,450,002 (Durkee), certain modifications to the process allow operation at pH levels in the range of 3.2 to 3.3, thus reducing sulfuric acid requirements. This is achieved by adding a centrifuge to the discharge end of the series of reaction cells. The centrifuge removes very finely divided particles of copper which would otherwise escape in the effluent. The '002 patent also teaches that much slower reaction rates are achieved at the higher pH ranges used in this process, so that adequate conversion of $Cu^{+2}$ may require recycle of part of the effluent stream back to the inlet of the series of reaction cells. As in the process described in the '599 patent, very large excesses of aluminum are used in comparison to stoichiometric requirements.

Yet another continuous process involving recycle of wastewater containing $Cu^{+2}$ is described in U.S. Pat. No. 3,905,827 (Goffredo et al). In that process, continuous radial flow through a large fixed bed of aluminum turnings is used to purify rinsewater so that it can be reused over and over again in the PC board manufacturing process. As in both versions of the Durkee process, a large excess of aluminum is necessarily used. And like the Durkee process, the Goffredo process is not suitable for treating wastewater streams containing high concentrations of metal cations.

The Durkee processes recover saleable copper, but they have significant drawbacks. Use of aluminum in many times stoichiometric quantities is wasteful (scrap aluminum has substantial resale value itself). Undesired side reactions between the aluminum and the sulfuric acid increase the concentration of soluble $Al^{+3}$ cations in the treated effluent. While not particularly toxic, such cations nevertheless are not desirable in treated water. In treating wastewater streams with high concentrations of $Cu^{+2}$ cations, such as pickling acids and electroless copper solutions, use of large excesses of aluminum poses a danger of thermal runaway because of the exothermicity of the Cu - Al redox reaction. In fact, the Durkee process is designed for continuous processing of low-concentration wastewater streams, and will not operate satisfactorily for batch processing of wastewater streams containing high metal cation concentrations. (Although U.S. Pat. '002 to Durkee teaches application of the process to highly-concentrated wastewater streams (col. 10, lines 7-11), no specific examples are provided, and experimentation has shown that the Durkee process, with its large excess of aluminum, fails to operate satisfactory on high-concentration waste streams.) Moreover, the Durkee process actually reduces $Cu^{+2}$ concentrations in the wastewater treated in the reaction cells only to levels around 50 ppm. In order to allow discharge to the sewer system at levels in the 1 ppm range, the treated wastewater is simply diluted with other wastewater that does not contain any copper. Federal and state environmental authorities generally will not accept wastewater treatment processes that can meet discharge concentration standards only by diluting an otherwise non-complying waste stream with clean water in order to reduce the concentration of pollutants to within acceptable limits. Thus, the Durkee process does not achieve substantially complete recovery of copper from the wastewater stream actually treated. The Durkee process does not provide for separate recovery of Pb and Sn from rinsewater streams that are also produced during other stages of PC board manufacture. Nor does Durkee provide for recovery of oxidized aluminum from the treated wastewater.

There is a need for a process and apparatus that safely achieves substantially complete copper recovery without need for final dilution, even when the feedstock contains very high levels of $Cu^{+2}$ and/or other metal cations; that minimizes both the consumption of aluminum and the level of $Al^{+3}$ cations in the treated effluent, and that can separately recover Pb, Sn and other metals of Groups IB, IIB, IIIA and IVA in saleable form from wastewater streams containing those contaminants.

SUMMARY OF THE INVENTION

The process of this invention uses two to four reaction vessels to treat high-concentration, metal-containing wastewater streams to recover the metals in saleable, elemental form, and to reduce the residual metal cation concentration to environmentallyacceptable levels without reliance on dilution with clean water. The process is particularly applicable to wastewater streams produced in the course of PC board manufacture, including wastewaters from pickling operations, electroless copper solutions, and wastewater streams containing lead and tin cations resulting from soldering operations. In the preferred embodiment of the invention, as applied to wastewater streams containing Cu, Pb and Sn, the wastewater streams are accumulated in separate reactors having means for retaining a bed of scrap aluminum above their bottoms, and also having liquid withdrawal pumps capable of continuously recirculating the wastewater from the bottom of the reactor to the freeboard above the liquid level in the top of the reactor. When the reactors are full, recirculation of the liquid is begun and a controlled amount of aluminum scrap is added— typically, 80% to 90% of the theoretical stoichiometric requirement for complete reduction of the copper or lead/tin rations to their elemental states. The temperature of the liquid is monitored and held below 180 F. and above 100 F. by addition of ice or sulfuric acid as needed. (In the descriptions that follow, reference is made to use of sulfuric acid by way of example, but those skilled in the art will understand that a range of mineral acids of appropriate strength can be substituted therefor without departing from the scope of this invention.) Sulfuric acid content is adjusted to within the range of 5% to 10% by volume. About 30 minutes after the reaction begins, additional aluminum scrap is added to bring the total aluminum present into the range of 160% to 180% of stoichiometric requirements for complete reduction of copper or lead/tin cations to their elemental states. Copper and lead/tin contents are monitored periodically, with additional controlled quantities of aluminum added if the reaction ceases before $Cu^{+2}$ and Pb/Sn cation contents reach acceptable levels of about 0.5 to 1.0 ppm or below.

When acceptable heavy metal cation levels have been achieved in the liquid, recirculation is stopped and the contents of both tanks are pumped together into a third reactor, to which sufficient caustic (usually NaOH) is added to raise the pH of the treated wastewater to roughly 7. A relatively small amount of $Al(OH)_3$ precipitates out of the liquid at this point and is retained on the perforated false bottom of the pH adjustment reactor. The liquid is then pumped out of the reactor into a filter press, and then to a final pH adjustment tank (the fourth reactor) where its pH is balanced to neutral (7.0) by addition of small amounts of caustic or sulfuric acid as required. From there, the treated wastewater is pumped through a "slim line" type filter, and discharged to the municipal sewer.

$Al(OH)_3$ from the pH adjustment reactor is pumped out in a water slurry and recovered in a filter press. The supernant water is pumped to the final pH adjustment tank to mix with the offtake from the pH adjustment reactor.

After the copper and Pb/Sn conversion reactors have been drained, the remaining untreated scrap aluminum and elemental copper or lead and tin is repeatedly washed. Initial washing is with water; subsequently a 2% NaOH solution is used, and finally water again. Water from these washings goes to the pH adjustment reactor. Finally, untreated scrap aluminum and saleable Grade 2 copper and lead/tin amalgam are removed from the conversion reactors and the treatment process is ready for repetition.

Accordingly, it is an object of this invention to provide an improved method for recovering metals of Groups IB, IIB, IIIA and IVA from aqueous waste streams. More particularly, it is an object of this invention to provide an improved method for recovering copper, lead and tin in their elemental states from pickling acid, electroless copper solutions, and rinsewaters from etching and soldering operations used in PC board manufacture.

It is a further object of this invention to provide a process and apparatus that will operate safely on wastewater streams having very high concentrations of metal cations, and in particular of $Cu^{+2}$ cations, without danger of thermal runaway.

It is a further object of this invention to recover elemental metals such as copper, lead and tin in their elemental states, in saleable form while conserving and eventually recovering the scrap aluminum used as a reducing agent.

Another object of this invention is to minimize the quantity of $Al^{+2}$ and $Al^{+3}$ cations released to municipal sewage systems in the treated wastewater.

Still another object of this invention is to provide a process that will reduce copper, tin and lead cation concentrations in the treated wastewater to the range of 0.5 to 1.0 ppm or below, suitable for discharge to municipal sewage systems, without need for a last stage of dilution with cation-free water, a procedure that is environmentally unacceptable.

Another object of this invention is to provide a four-reactor system using simple batch processing tanks that is capable of treating both copper-containing and lead/tin containing wastewaters, in which aluminum scrap consumption is minimized and heavy metal recovery is facilitated.

Another object of this invention is to provide simplified two- and three-reactor systems for sequential recovery of different metals from wastewater streams, in which one metal recovery reactor is used alternately for more than one type of metal.

Further objects and advantages of this invention will be apparent to those skilled in the art from a review of the following drawings and description of the preferred four-reactor embodiment and other embodiments of the invention, as well as the claims. It will be apparent to those skilled in the art that the invention is not limited to the embodiments described below, but that other combinations of apparatus, and variations on processing parameters, also can be used to practice this invention without departing from the scope of the claims.

DESCRIPTION OF THE FOUR-REACTOR PREFERRED EMBODIMENT

Figure 1A:
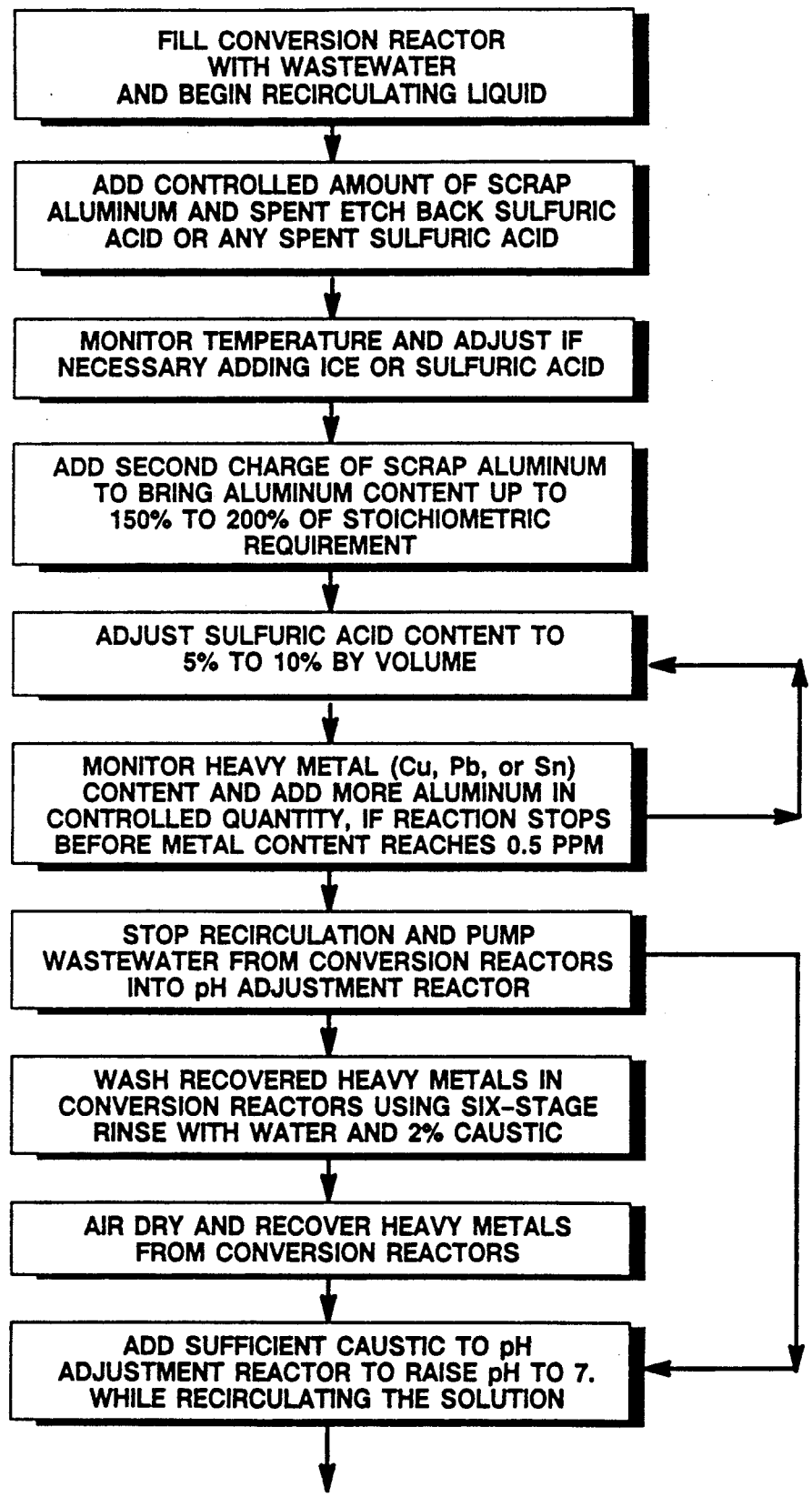
FIG. 1 is a block diagram indicating the method of the preferred embodiment of the invention in schematic form.
Figure 1B:
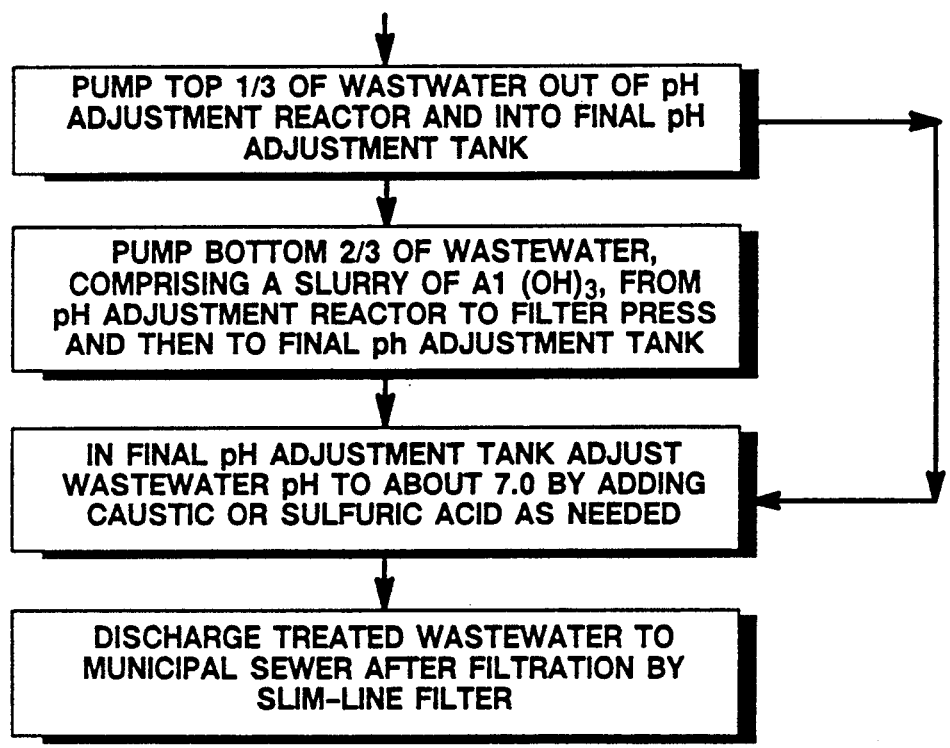
Figure 2:
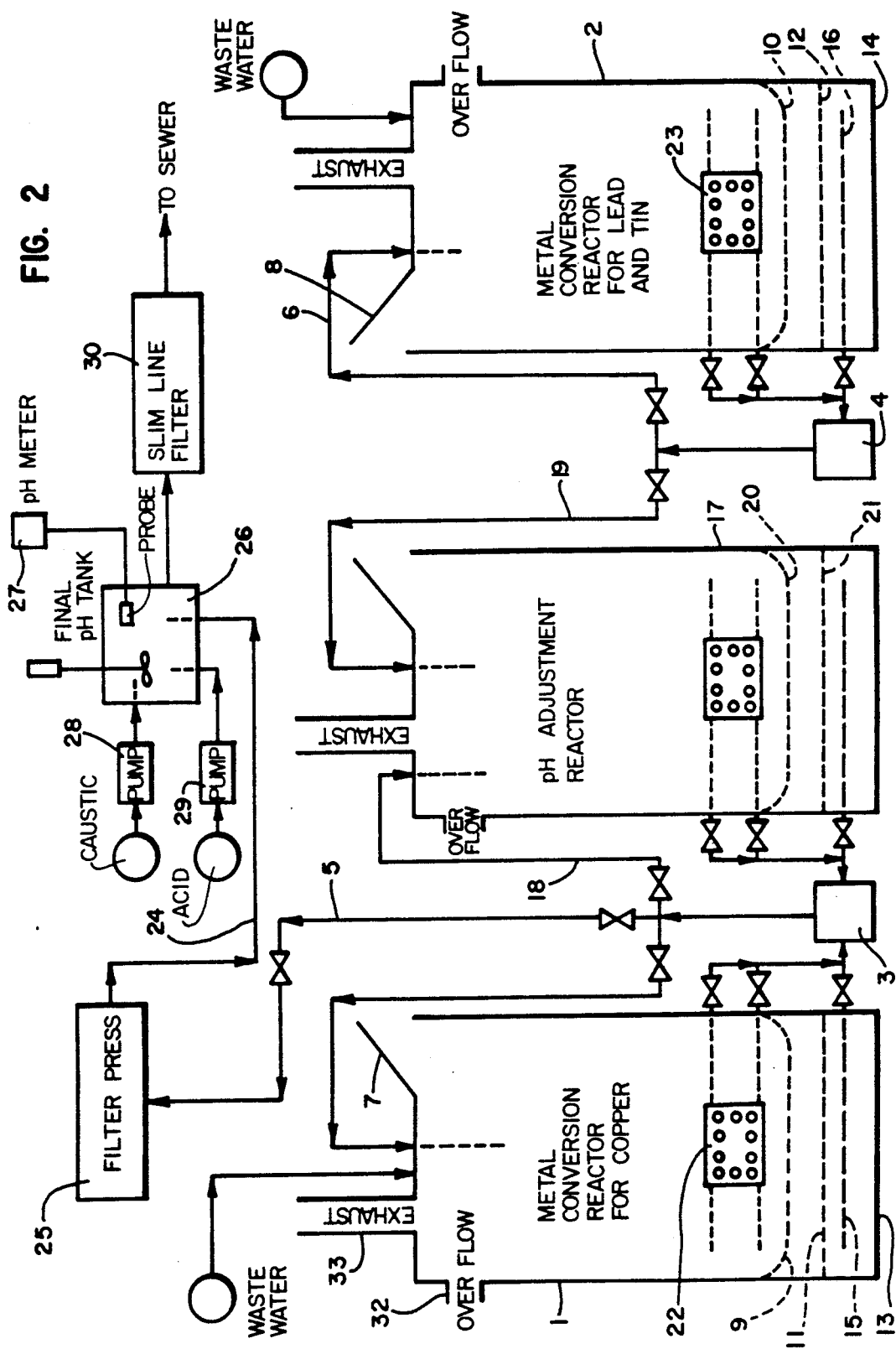
FIG. 2 is a flowsheet illustrating the principal pieces of equipment used to practice the invention in its preferred four-reactor embodiment.

Referring initially to FIGS. 1 and 2, the first step in the process is to collect copper-containing wastewater in copper recovery reactor 1, and lead and tin-containing wastewater in lead/tin recovery reactor 2. In the four-reactor preferred embodiment, the recovery reactors are 500 gallon capacity fiberglass tanks with wall thicknesses ranging from $\frac{3}{8}$ inch at the top to $\frac{1}{4}$ to $\frac{3}{8}$ inch at the bottom. The copper-containing wastewater preferably consists of spent solution from acid pickling operations and electroless copper solution, so that the mixed wastewater in the tank already contains sufficient sulfuric acid that its pH is below 1.0 and the $Cu^{+2}$ cation content is around 10,000 ppm. (To those skilled in the art, however, it will be apparent that alkaline wastewaters also can be treated by acidifying them before going on to subsequent processing steps.) If the $Cu^{+2}$ cation content diverges significantly from the 10,000 ppm range, the amounts of scrap aluminum stated below can be adjusted proportionately, so as to maintain the stated relationships between aluminum used and theoretical, stoichiometric requirements for reduction of the $Cu^{+2}$ cations to their elemental state.

When the reactors are full, pumps 3 and 4 are started, recirculating the wastewater from the bottom of the reactors back through the overhead pipes 5 and 6 into the tops of the reactors. The reaction is started by loading ten pounds of aluminum scrap (about 80% to 90% of the stoichiometric requirement for complete conversion of the copper cations to their elemental states) into each of the conversion reactors through top hatches 7 and 8. At the same time, about 5 gallons of spent etch back sulfuric acid or any other spent sulfuric acid is also pumped into each of the two reactors. The scrap aluminum immediately sinks to the perforated false bottoms 9 and 10 of the reactors, which are preferably slightly concave upward. The scrap aluminum is retained on the false bottoms 9 and 10 above the perforated, fiberglass horizontal liquid withdrawal pipes 11 and 12. Withdrawal pipes 11 and 12, which are preferably about 18 inches in diameter, extend across the plenums formed between the bottom heads of the reactors 13 and 14 and the perforated false bottoms 9 and 10. Inside the withdrawal pipes are concentric cylindrical filters 15 and 16, which consist of perforated fiberglass pipes about 3 inches in diameter covered by poly filter bags having about 5 micron pores. The filters 15 and 16, like the withdrawal pipes 11 and 12, extend entirely across the bottoms of the reactors 1 and 2.

After the first charge of aluminum scrap has been added, the temperature of the wastewater in the reactors is monitored and held between 100 F. and 180 F. by adding ice if necessary to cool the liquid, or more sulfuric acid if necessary to heat it. Approximately 30 minutes after the first charge of aluminum scrap has been added, a second charge of about 10 lbs. of aluminum scrap is added to each of the reactors, bringing the total amount of aluminum added into the approximate range of 160% to 180% of the theoretical stoichiometric amount needed for complete reduction of the metal cations in solution to their elemental states. Reduced copper, lead and tin form on the aluminum scrap and likewise are retained on the false bottoms 9 and 10 of the reactors. The circulating wastewater is sampled and analyzed for sulfuric acid content using techniques known in the art, such as addition of methyl orange followed by titration with a base.

No sooner than 30 minutes after addition of the second charge of aluminum scrap, sufficient additional sulfuric acid is added to bring the acid content of the circulating wastewater into the range of 5% to 10% sulfuric acid by volume. It has been found that acid concentrations as high as 20% by volume are feasible, but optimum results are obtained in the range of 5% to 10% because below 5% the rate of reaction is almost imperceptible, and above 20% there is considerable danger of boiling of the wastewater and thermal runaway. At very high sulfuric acid concentrations, it may be necessary to reduce the amount of scrap aluminum used in order to avoid thermal runaway. Moreover, use of sulfuric acid concentrations above 20% results in large increases in the cost of NaOH needed for neutralization. Recirculation of the wastewater ensures that the metal-containing wastewater flows downward through the bed of aluminum scrap supported on false bottoms 9 and 10, eventually exposing all of the wastewater to repeated contact with the aluminum scrap.

Beginning about 24 hours after the first charge of aluminum scrap has been added, the recirculating wastewater is sampled periodically and analyzed for metal cation content (typically Cu, Pb and Sn, although as noted above other metals of Groups IB, IIB, IIIA and IVA may be recovered as well) using techniques known to those skilled in the art, such as atomic absorption spectroscopy. If the reaction stops before the desired level of metal cation content has been attained (typically about 0.5 to 1.0 ppm), an additional 10 pound charge of scrap aluminum may be added. The target level of 0.5 to 1.0 ppm of metal cations usually is attained within one to four days, so that sampling is appropriately conducted on a once-a-day basis.

After the target level of metal cation content has been attained, the wastewater from reactors 1 and 2 is pumped together into pH adjustment reactor 17 by pumps 3 and 4 through transfer pipes 18 and 19. The pH adjustment reactor 17 is constructed in the same fashion as metal recovery reactors 1 and 2, including provision for recirculation of liquid using pump 3, except that instead of a 3 inch filter inside of a 18 inch perforated tube below its dished false bottom 20, the pH adjustment reactor simply has a 18 inch diameter perforated pipe 21. The pH adjustment reactor 17 also may be built with a liquid capacity roughly twice that of the metal conversion reactors 1 and 2, so that it can accommodate demetallized wastewater from both copper and lead/tin recovery operations simultaneously.

When the demetallized wastewater has been pumped out of the metal conversion reactors 1 and 2, the remaining, unreacted scrap aluminum and recovered copper and lead/tin mixture retained on the false bottoms 9 and 10 of the reactors is washed with water and dilute caustic, preferably in the following sequence:

1. Three consecutive clean water washes.
2. Two washes with 1 to 3 wt% NaOH solution.
3. One final clean water wash.

Wash water from this operation is pumped into pH adjustment reactor 17. Finally, after the washing cycle is complete, manhole covers 22 and 23 are opened and cleaned, saleable second grade copper, lead and tin are manually recovered along with unreacted aluminum. Recovered metals should be air-dried before sale.

The wastewater in the pH adjustment reactor 17 is next neutralized by addition of sufficient caustic to raise its pH to approximately 7. This typically causes precipitation of $Al(OH)_3$, which remains suspended in the wastewater as a slurry or floc. After precipitation, the slightly basic wastewater and precipitated $Al(OH)_3$ is pumped out of the pH adjustment reactor 17 through perforated pipe 21, which is unfiltered, by pump 3 through transfer pipe 24 and to filter press 25. The filter press recovers precipitated $Al(OH)_3$, and filtered, demetallized water passes from the filter press into the final pH adjustment tank 26. Final pH adjustment tank 26 also can receive wastewaters that do not contain significant metal cation concentrations from other plant process, but that require pH adjustment before discharge to the sewer system. In the tank, the liquid pH is measured by pH meter 27, which automatically controls caustic supply pump 28 and acid supply pump 29 so as to neutralize the wastewater, producing a final neutral pH of 7.0. Finally, neutralized wastewater is pumped through a final stage of filtering using a "slimline" type filter 30, and then discharged to the municipal sewer.

Figure 3:
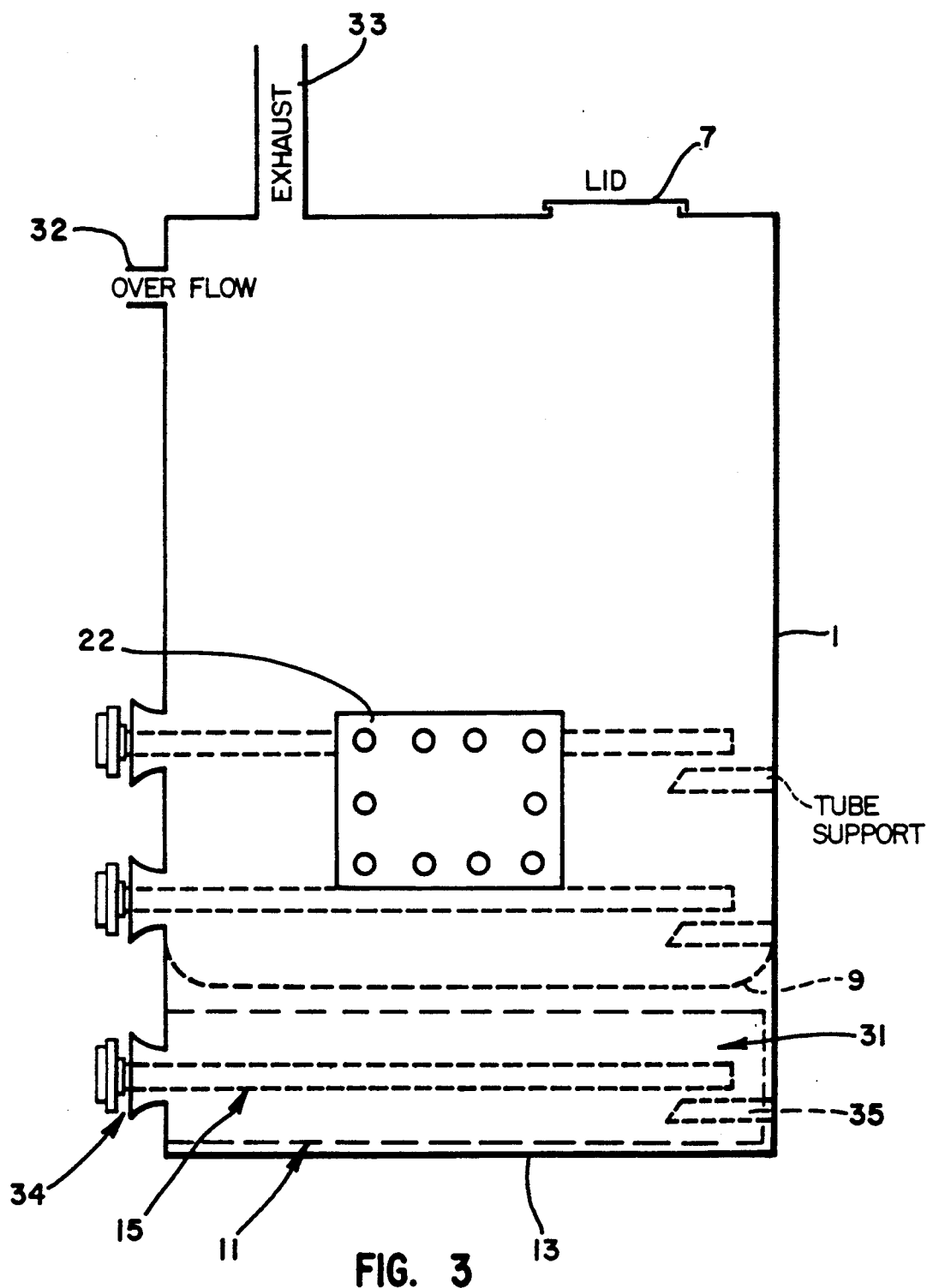
FIG. 3 is a detail showing internal construction features of the two conversion reactors and the first pH adjustment reactor, shown in FIG. 2.

FIG. 3 shows construction details of the copper and lead/tin conversion reactors. Empty fiberglass tanks have been used in the past to recover metallic copper from these sorts of wastewaters by reaction with elemental aluminum, and these tanks have included features such as the loading hatch 7, manhole 22, overflow outlet 32 and exhaust gas outlet 33 (which is usually connected to the plant fume hood system to vent evolved hydrogen). But the internal structure shown in FIG. 3 is novel. Its primary features of interest are the dished, perforated false bottom 9, which is mildly concave upward, and the underlying perforated 18 inch diameter pipe 11 enclosing a 3 inch diameter perforated tube 15 which is covered with a 5 micron filter bag. The false bottom 9 supports the aluminum scrap which reduces the metal cations, while allowing free flow of recirculating wastewater through the bed of aluminum scrap and into the underlying plenum 31. The large perforated tube 15 extends all the way across the plenum 31 and screens out any small pieces of scrap that may fall through the false bottom 9. Inside the perforated pipe 11, a 3 inch diameter tube covered with a 5 micron filter 15 acts as a liquid withdrawal device, filtering out any smaller solid particles that may have gotten through the false bottom 9 and the larger pipe 11. (The end of the filter 15 that is furthest from the outlet flange 34 rests on pipe support means 35, which projects from the far wall of the reactor 1.) In this way the filter 15 is not overloaded and choked by exposure to heavy concentrations of large metal particles, making sustained, continuous recirculation possible over the entire period of the reduction operation. (Vertical bag filters used in prior art conversion reactors tended to clog part way through the conversion process, reducing or stopping the recirculation of wastewater and thereby substantially limiting mass transfer efficiencies.)

The following specific examples conducted under the conditions of the Summary of the Invention are illustrative of the operation of the invention.

| INITIAL METAL CONCENTRATION PPM BY WEIGHT | FINAL METAL CONCENTRATION PPM BY WEIGHT |
|---|---|
| 9600 ppm $Cu^{+2}$ | 1.20 ppm $Cu^{+2}$ |
| 5500 ppm $Cu^{+2}$ | 0.91 ppm $Cu^{+2}$ |
| 9000 ppm $Cu^{+2}$ | 0.93 ppm $Cu^{+2}$ |
| 15000 ppm $Cu^{+2}$ | 0.21 ppm $Cu^{+2}$ |
| 35000 ppm $Cu^{+2}$ | 1.10 ppm $Cu^{+2}$ |
| 9000 ppm $Cu^{+2}$ | 0.90 ppm $Cu^{+2}$ |
| 5600 ppm $Cu^{+2}$ | 0.23 ppm $Cu^{+2}$ |
| 300000 ppm $Cu^{+2}$ | 0.54 ppm $Cu^{+2}$ |
| 10000 ppm $Cu^{+2}$ | 0.27 ppm $Cu^{+2}$ |
| 1400 ppm $Cu^{+2}$ | 0.26 ppm $Cu^{+2}$ |
|  | 642 ppm Al |
| 13000 ppm $Pb^{+2}$ | 0.50 ppm $Pb^{+2}$ |

The tests reported above produced the results shown within reaction times of one to four days. In contrast, a test conducted on a high $Cu^{+2}$ concentration waste stream under conditions similar to those used in the Durkee process required eight days to reduce the $Cu^{+2}$ concentration below 1 ppm. Moreover, the test used many times as much aluminum scrap as that required in the process of this invention.

DESCRIPTION OF A THREE-REACTOR EMBODIMENT

Figure 4:
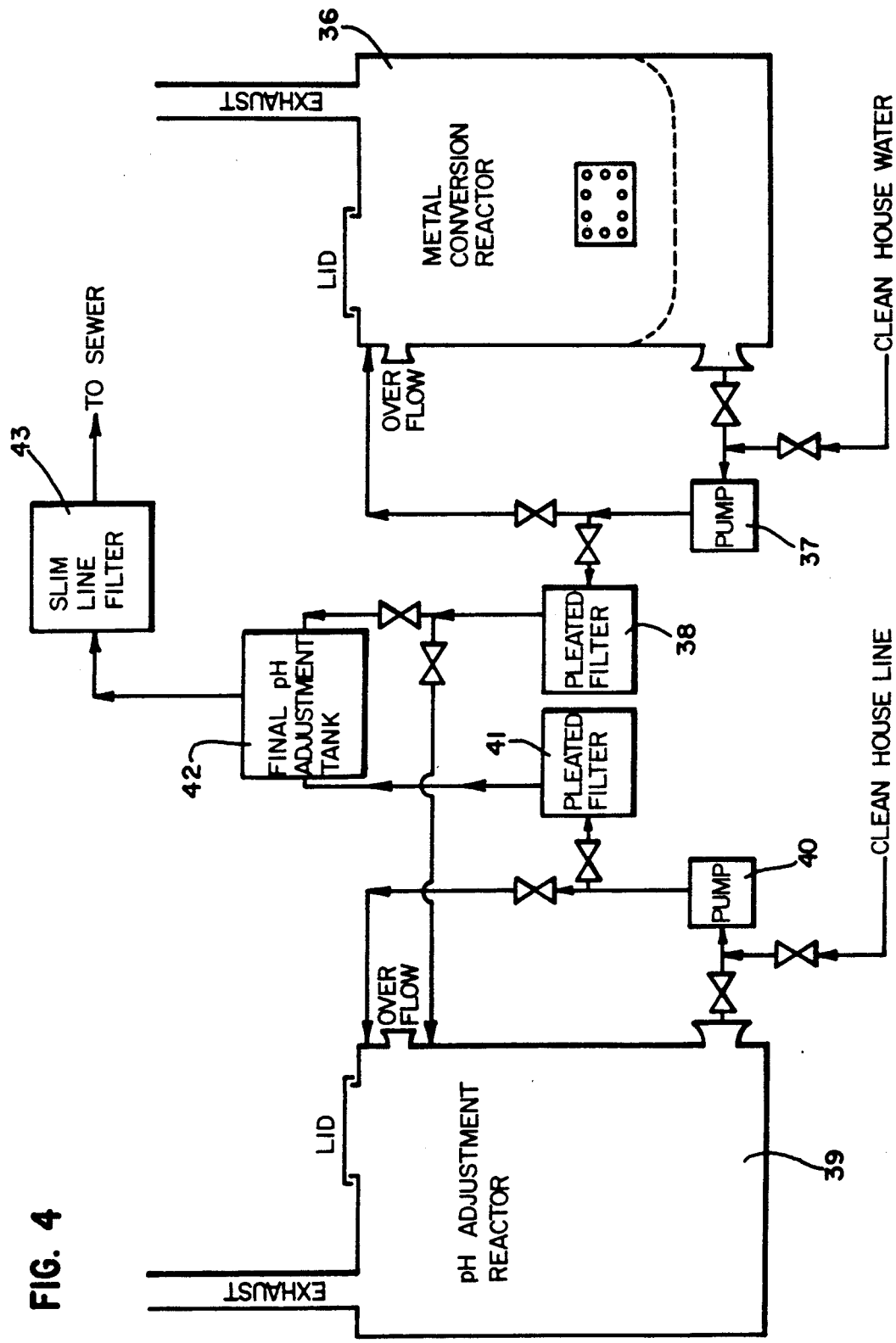
FIGS. 4 and 5 are flowsheets illustrating the principal pieces of equipment used to practice the invention in a simplified form using only three reactors
Figure 5:
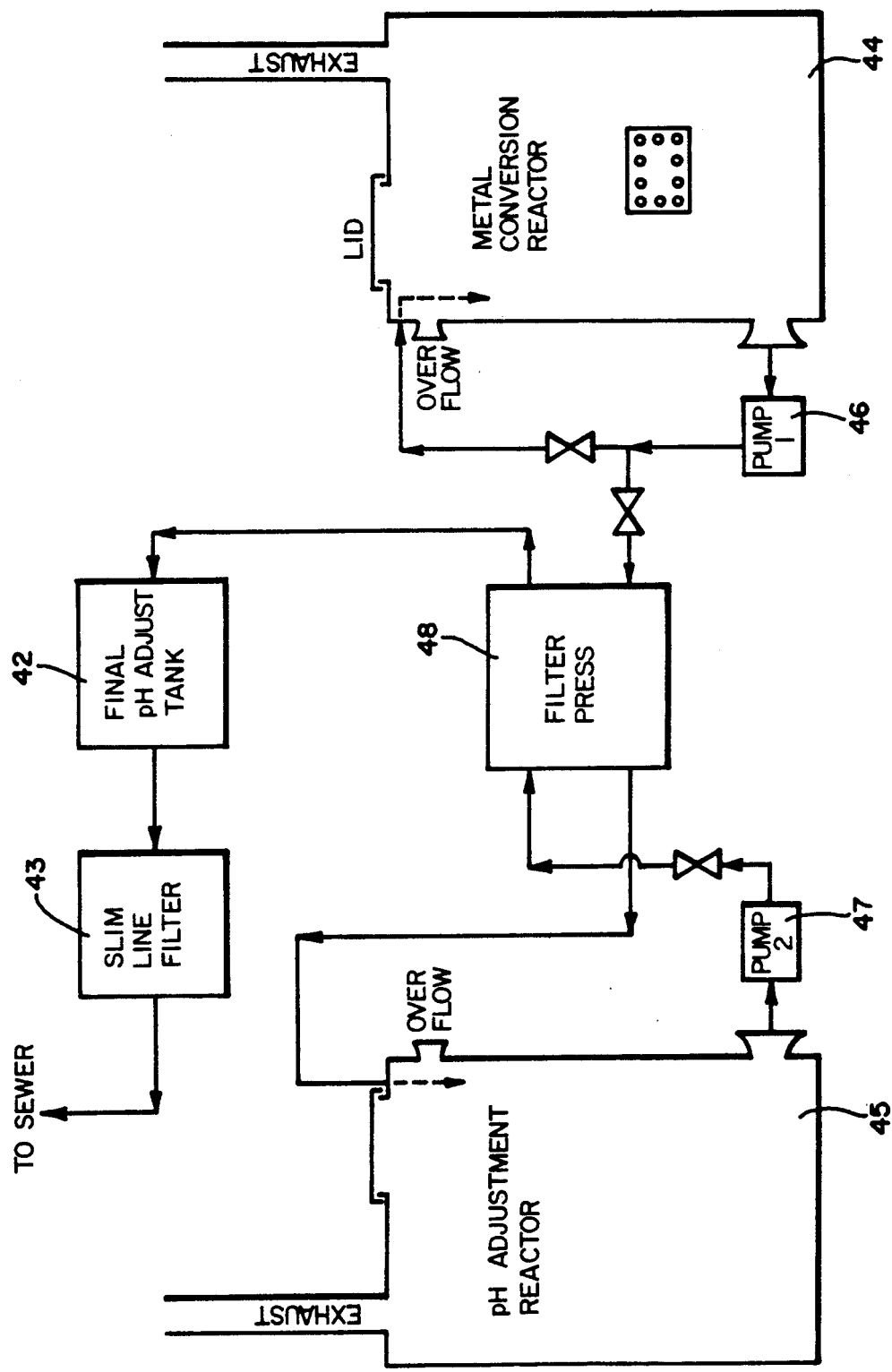

FIGS. 4 and 5 show how the process can be practiced on just one wastewater stream at a time using only three reactors instead of four. In FIG. 4, the metal conversion reactor 36 is constructed and operated according to the same principles as the copper and lead/tin conversion reactors shown in FIGS. 2 and 3. It is first charged with wastewater containing one metal cation, such as copper, in significant concentration, and operated according to the sequence shown in FIG. 1. When tests show that reduction of the metal cation is complete, the solution is pumped out of the metal conversion reactor 36 by pump 37 through a pleated filter 38 and into the pH adjustment reactor 39, where caustic is added while recirculating the solution through pump 40 to raise the pH to approximately 7, resulting in precipitation of a floc of $Al(OH)_3$. Saleable metal and the remaining unreacted scrap aluminum is recovered from metal conversion reactor 36 by washing and drying as in the preferred embodiment described above. After precipitation, the supernant liquid from the pH adjustment reactor 39 is pumped through pump 40, to pleated filter 41 and thence into the final pH adjustment tank 42. There the pH of the filtered effluent is adjusted to neutral (7.0), and subsequently discharged through slim line filter 43 to the municipal sewer. Wastewater streams that do not contain significant concentrations of metal cations also can be neutralized in the final pH adjustment tank 42 before discharge.

The three-reactor embodiment also can be configured as shown in FIG. 5. In this embodiment, neither the metal conversion reactor 44 nor the pH adjustment reactor 45 has a dished false bottom like that shown in FIG. 3. Instead, scrap aluminum and reduced metal simply rest at the bottom of the reactor, and recirculation of liquid is accomplished by means of diaphragm pumps 46 and 47, which can tolerate some suspended solids in the liquid being pumped. After metal reduction is complete, filter press 48 is used to recover any suspended aluminum or reduced metal from the liquid as it is pumped to pH adjustment reactor 45. After cleaning, the same filter press 48 is used to recover $Al(OH)_3$ from the approximately neutralized effluent from pH adjustment reactor 45. This embodiment uses reactors of simpler construction than those discussed above.

In both of the three-reactor embodiments, wastewater streams containing different metal cations can be treated sequentially. For example, in the embodiment of FIG. 4, wastewater streams containing lead and tin cations could be accumulated in a holding tank (not shown) while metal conversion reactor 36 was used to treat copper-containing wastewater; then the lead/tin wastewaters could be treated while copper-containing wastewater was stored. In this way the process of this invention may be practiced using only two reactors with the internals shown in FIG. 3, instead of three such reactors as in the preferred four-reactor embodiment. The disadvantage is that larger reactors are required because of the need to accumulate wastewaters while alternately treating different wastewater streams.

DESCRIPTION OF A TWO-REACTOR EMBODIMENT

Figure 6:
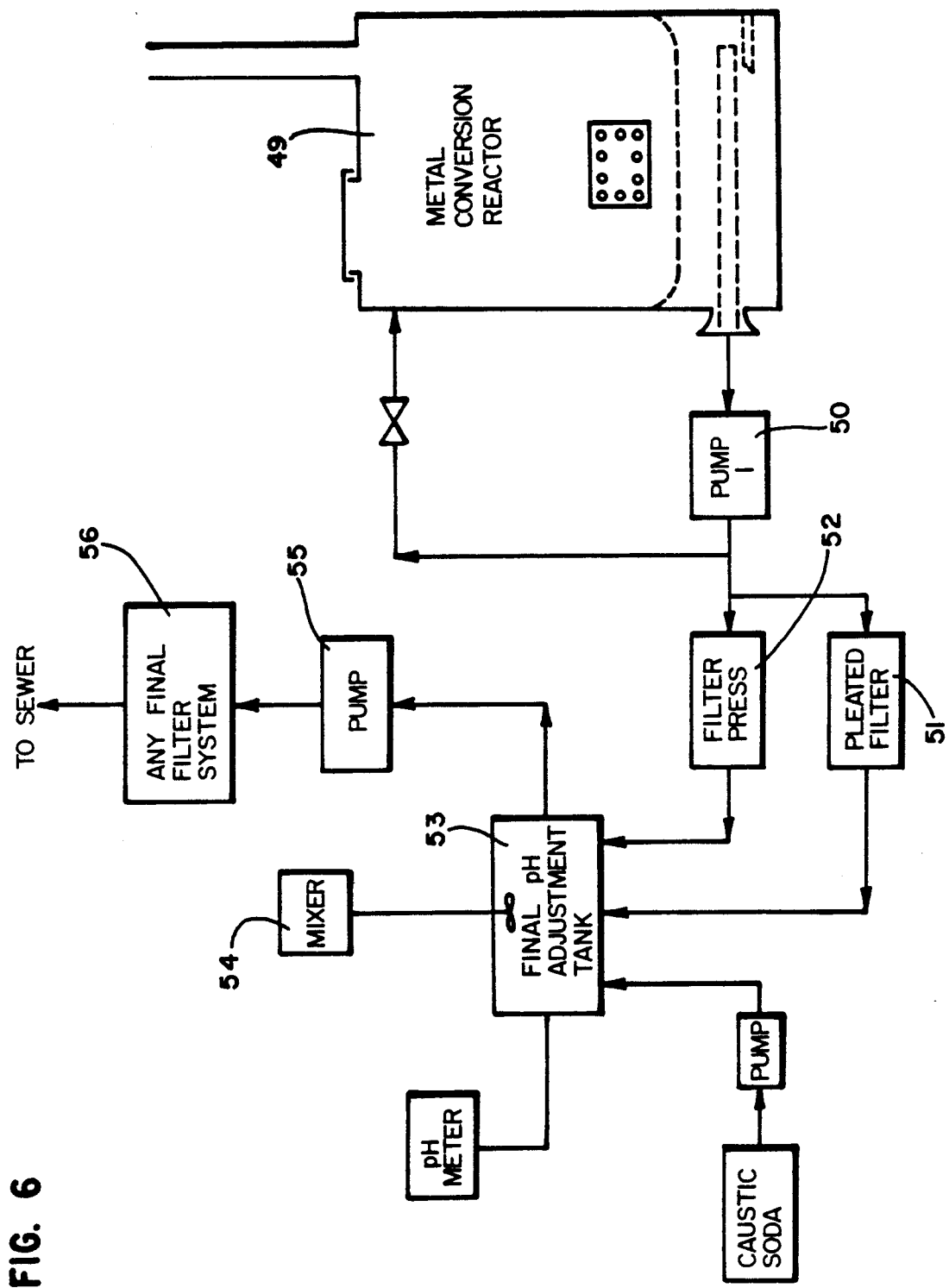
FIG. 6 is a flowsheet showing the most important items of equipment used to practice the invention in a further simplified way using only two reactors.

By combining the functions of the pH adjustment reactor with those of the final pH adjustment tank of the preferred four-reactor embodiment, and by treating only one type of metal-containing wastewater stream at a time, it is possible to practice this invention using only two reactors FIG. 6 illustrates this embodiment of the invention. Here, a single metal conversion reactor 49 is constructed as shown in FIG. 3 and operated as described in FIG. 1, as in the four-reactor preferred embodiment. After the reaction is complete, the treated wastewater is pumped out of metal conversion reactor 49 by pump 50 through pleated filter 51 or filter press 52 and directly into final pH adjustment tank 53. That tank is equipped with mixer 54 to facilitate neutralization of the solution and to maintain the $AL(OH)_3$ floc in suspension. When the pH has reached 7.0, the treated, neutralized wastewater is pumped from the pH adjustment tank 53 by pump 55 to a filter system 56, which is suitable for recovering $Al(OH)_3$ floc before discharge of the treated water to the sewer system. Like the three-reactor embodiments described above, this two-reactor embodiment can be combined with one or more wastewater storage tanks (not shown), and sized appropriately to sequentially process wastewater streams containing different dissolved metal cations.

The foregoing detailed descriptions of several embodiments of the invention illustrate various methods and apparatuses suitable for practicing the invention. Additional embodiments may be perceived by those skilled in the art. In particular, with appropriate alterations in operating conditions it should be possible to practice the invention on a continuous rather than a batchwise basis. Such additional embodiments also are within the scope of this invention.

We claim:
1. A method of reclaiming heavy metal from a concentrated wastewater solution containing heavy metal cations and an acid, comprising the steps of:
   a. adding to said wastewater a bed of scrap aluminum in a total amount between about 160% and about 180% of the stoichiometric requirement for complete reduction of the dissolved heavy metal cations to their elemental states;
   b. adjusting the acid content of said wastewater to 5% to 20% by volume;
   c. allowing said heavy metal cations to react with said scrap aluminum, whereby said aluminum is oxidized and said heavy metal cations are reduced to their elemental states, and demetallized wastewater is produced;
   d. neutralizing said demetallized wastewater with caustic to produce a treated effluent.

2. The method of claim 1 wherein said acid is sulfuric acid.

3. The method of claim 1 wherein said heavy metal cations are selected from cations of metals of the group consisting of Groups IB, IIB, IIIA and IVA of the periodic table of elements.

4. The method of claim 2 wherein said heavy metal cations are selected from the group consisting of copper cations and a mixture of lead and tin cations.

5. The method of claim 4, wherein the step of adding said scrap aluminum comprises the following operations:

a. adding about one half of said total amount of scrap aluminum;

b. adjusting the temperature of said wastewater to between about 100 F. and 180 F., and c. adding the second half of said total amount of scrap aluminum.

6. The method of claim 5, wherein the step of reducing said heavy metal cations further comprises recirculating said wastewater through said bed of scrap aluminum until the concentration of said heavy metal cations has been reduced to about 0.5 to 1 ppm.

7. The method of claim 6, wherein the step of neutralizing said demetallized wastewater comprises the following operations:

a. decanting said demetallized wastewater from said scrap aluminum and adding sufficient caustic to raise the pH of said demetallized wastewater to about 7;

b. filtering out of said demetallized wastewater any aluminum hydroxide that has precipitated out as a result of said increase in pH, and c. adjusting the pH of said filtered, demetallized wastewater to neutral (7.0), by adding caustic or sulfuric acid as required.

8. The method of claim 7, further comprising the step of recovering elemental heavy metal and scrap aluminum.

9. The method of claim 8, wherein said step of recovering elemental heavy metal and scrap aluminum comprises the following operations:

a. washing said scrap aluminum and elemental heavy metals three times with clean water;

b. washing said scrap aluminum and elemental heavy metals twice with a 1% to 3% by weight aqueous solution of NaOH;

c. washing said scrap aluminum and elemental heavy metals one final time with clean water; and d. air drying said scrap aluminum and elemental heavy metals.

10. A method of reclaiming heavy metal from a concentrated wastewater solution containing sulfuric acid and heavy metal cations selected from the group consisting of copper cations and a mixture of lead and tin cations, comprising the steps of:

a. adding to the wastewater scrap aluminum in an amount between 80% and 90% of the stoichiometric requirement for reducing the dissolved metal cations;

b. adjusting the temperature of the wastewater to within the range of about 100 F. to 180 F.;

c. adding a second charge of scrap aluminum to said wastewater in an amount sufficient to raise the total amount of aluminum to between 160% and 180% of the stoichiometric requirement for reducing the dissolved metal cations;

d. adjusting the sulfuric acid content of said wastewater to about 5% to 10% by volume;

e. recirculating said wastewater through said scrap aluminum, allowing the reduction of heavy metal to continue until the heavy metal content of said wastewater has dropped to 0.5 to 1.0 ppm, whereby elemental heavy metal and demetallized wastewater is produced and some scrap aluminum remains unreacted;

f. decanting said demetallized wastewater from said elemental heavy metal and said unreacted scrap aluminum;

g. recovering said elemental heavy metal and unreacted scrap aluminum by rinsing said elemental heavy metal and unreacted scrap aluminum by conducting the following operations: (1) washing said unreacted scrap aluminum and elemental heavy metals three times with clean water; (2) washing said unreacted scrap aluminum and elemental heavy metals twice with a 1% to 3% by weight aqueous solution of NaOH; (3) washing said unreacted scrap aluminum and elemental heavy metals one final time with clean water; and (4) air drying said untreated scrap aluminum and elemental heavy metals;

h. adjusting the pH of said demetallized wastewater to about 7 by adding caustic, whereby aluminum hydroxide may be precipitated out of said demetallized wastewater;

i. filtering said aluminum hydroxide, if any, out of said demetallized wastewater;

j. adjusting the pH of said filtered, demetallized wastewater to neutral (7.0), and k. discharging said filtered, demetallized wastewater to a municipal sewer.

11. The method of claim 10, wherein two metal conversion reactors are used simultaneously to recover copper in one reactor and lead/tin in the other.

12. The method of claim 10, wherein a single metal conversion reactor is used to sequentially treat a plurality of wastewater streams, each containing one or more different dissolved metal cations.

* * * * *